United States Patent [19]

Klanderman et al.

[11] 3,720,701
[45] March 13, 1973

[54] 9,10-BRIDGED ANTHRACENE COMPOUNDS

[75] Inventors: Bruce H. Klanderman; Jan W. H. Faber, both of Rochester, N.Y.

[73] Assignee: Eastman Kodak Company, Rochester, N.Y.

[22] Filed: Nov. 30, 1970

[21] Appl. No.: 93,815

Related U.S. Application Data

[60] Division of Ser. No. 811,655, March 28, 1969, Pat. No. 3,577,366, which is a division of Ser. No. 616,789, Feb. 17, 1967, Pat. No. 3,457,235, which is a continuation-in-part of Ser. No. 530,381, Feb. 28, 1966, abandoned.

[52] U.S. Cl.....260/475 FR, 260/488 CD, 260/515 P
[51] Int. Cl. ....C07c 63/46, C07c 69/16, C07c 69/76
[58] Field of Search.......260/475 FR, 488 CD, 515 P

[56] References Cited

UNITED STATES PATENTS 3,396,148  8/1968  Kolobielski..........................260/618

*Primary Examiner*—Henry R. Jiles
*Assistant Examiner*—E. Jane Skelly
*Attorney*—W. H. J. Kline and William E. Neely

[57] ABSTRACT

New 9,10-bridged anthracene compounds, such as 9,10-bis(carbethoxy)triptycene improve certain properties of polyesters prepared by polymerization or dicarboxylic acid, such as terephthalic acid, and an alkylene glycol, such as ethylene glycol, when incorporated in the polymerization mixture.

11 Claims, No Drawings

9,10-BRIDGED ANTHRACENE COMPOUNDS

This application is a division of our copending U.S. application Ser. No. 811,655 filed Mar. 28, 1969, now U.S. Pat. No. 3,577,366, which is a division of our U.S. application Ser. No. 616,789 filed Feb. 17, 1967 (now U.S. Pat. No. 3,457,235 patented July 22, 1969), which is a continuation-in-part of our abandoned application Ser. No. 530,381 filed Feb. 28, 1966.

Polyesters comprise one of the better known families of plastic materials, and they are widely used in the manufacture of films, fibers, and molded articles of all types. Polyesters are normally prepared by the condensation of a glycol with either a dicarboxylic acid or an ester of a dicarboxylic acid. While polyesters have many excellent properties, improvement of any property thereof is desirable. It has been found that certain properties of polyesters can be further improved by adding a modifier compound described hereinafter to the polymerization formulation. The present invention is concerned with improving certain properties of polyesters without adversely affecting the other properties thereof and is primarily directed to new polyester compositions. In particular, the modified polyesters of this invention have higher heat distortion temperatures, higher glass transition temperatures, and lower crystallinities.

It is an object of this invention to provide novel polyester compositions. Another object of this invention is to provide polyester compositions having improved heat distortion temperatures. Another object of this invention is to provide polyester compositions having improved glass transition temperatures. Another object of this invention is to provide polyester compositions having lower crystallinities. Another object of this invention is to provide improved polyester supports for motion picture film and other photographic products which provide much better dimensional stability than previously known polyesters under elevated temperature conditions. It is another object of the invention to provide polyesters of very great dimensional stability which can be admixed with conventional polyesters to provide photographic support materials of higher dimensional stability than previously known polyester film supports. A further object is to provide novel 9,10-bridged anthracene compounds. Another object is to provide novel polymerizable compositions. Other objects are to provide novel polyester fibers which resist deformation up to temperatures appreciably above 100°C., and novel polyester materials for the preparation of insulating films and coatings useful in electrical applications at elevated temperatures. Other objects will appear hereinafter.

The foregoing objects are accomplished by providing (1) a polyester which consists essentially of the copolymeric residue of a dicarboxylic acid, an alkylene glycol and at least 2 mole percent, based on the total moles of all components in the polyester of a 9,10-bridged anthracene having the general formula I, (2) a polymerizable composition which when polymerized gives a polyester just described, and (3) novel 9,10-bridged anthracene compounds described hereinafter.

Such 9,10-bridged anthracene compounds are conveniently prepared by reacting anthracene, or a derivative of anthracene, with a dienophile. The dienophile can be an organic compound having a carbon-carbon double or triple bond. Examples of such dienophiles include, for example, benzyne, ethylene, acetylene, cyclopentadiene, maleic anhydride, maleimide, vinyl chloride, vinyl bromide, 1,2-dibromoethylene, 1,2-dichloroethylene propene, 1-butene, 2-butene, 1-pentene, 2-pentene, hexene, bicyclo-[2.1.1]hexene, bicyclo[2.2.1]heptene, bicyclo[2.2.2]octene, bicyclo[2.3.2]nonene, cyclopentene and cyclohexene.

A number of 9,10-bridged anthracene compounds are known, e.g., triptycene, 1,4-triptycene diol, 9,10-dihydro-9,10-ethanoanthracene, etc. However, the polyesterifiable, difunctional 9,10-bridged anthracene compounds used in the preparation of the new polyester compositions of this invention are new and are claimed in this application. These 9,10-bridged anthracene compounds and their preparation are fully described hereinafter.

The new 9,10-bridged anthracene compounds employed in the preparation of the new polyester compositions of this invention have the general formula:

I.

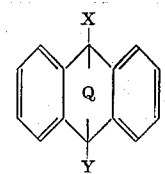

wherein X and Y each represents a carboxy group, a hydroxyalkyl group, especially a hydroxyalkyl group having one to four carbon atoms, or a carbalkoxy group, especially a carbalkoxy group having two to five carbon atoms, and Q represents (1) ⌬ , (2)a —C(R)(R')—C(R)(R')— bridge wherein each R represents a hydrogen atom, a halogen atom or an alkyl group, each R' is a hydrogen atom and wherein both R's collectively represent a chemical bond, (3) a bicyclohexano group, (4) a bicycloheptano group (5) a bicycloctano group, (6) a bicyclononano group, (7) a 5-membered cycloaliphatic ring, (8) a 6-membered cycloaliphatic ring or (9) a —C(=O)—N(R₁)—C(=O)— group wherein R₁ represents a hydrogen atom, an alkyl group having one to four carbon atoms or an unsubstituted phenyl group.

Preferred compounds are those wherein Q is one of the following structures:

⌬ , ⌬ , —C(=O)—N(R₁)—C(=O)—, and —CH₂—CH₂— wherein $R_1$ is as defined hereinbefore.

It is understood of course, that the chemical bond represented by both R's when taken together may form with the C — C bond of the Q radical, an olefinic structure.

The novel 9,10-bridged anthracene compounds having the formula I wherein X and Y each represents hydroxymethyl can be made by preparing 9,10-bis(acetoxymethyl)anthracene, according to the procedure of Miller et al., J. Am. Chem. Soc., 77, 2845 (1955), for example, reacting the 9,10-bis(acetoxymethyl)-anthracene with a dienophile set forth hereinbefore, and converting the acetoxymethyl groups to hydroxymethyl groups. The compounds wherein the members X and Y of formula I each represents a carboxy group or a carbalkoxy group can be prepared from the hydroxymethyl compounds using procedures illustrated hereinafter in the Examples. The preparation of the compounds wherein the members X and Y of formula I each represents a hydroxyalkyl group other than hydroxymethyl is also described hereinafter.

The polyester compositions of this invention are those obtained by the condensation of a glycol, a dicarboxylic acid or its diester derivative and a 9,10-bridged anthracene compound having the general formula I. A particularly desirable type of polyester is one which is obtained by the condensation of a phthalic acid or its diester derivative, an alkylene glycol of two to 10 carbon atoms and a 9,10-bridged anthracene compound having the general formula I. The most preferred polyesters of the invention are obtained when terephthalic acid or its diester derivative, ethylene glycol and a 9,10-bridged anthracene having the general formula I are copolymerized. As just indicated, it is intended, within the description of this invention, that a dicarboxylic acid and its derivatives, which upon hydrolysis produce the dicarboxylic acid, are fully equivalent alternatives for use in the preparation of the polyesters of this invention. Such derivatives include the dialkyl esters having one to four carbon atoms in the alkyl portion of each ester group, the diacid halides and the like.

Particularly suitable glycol derivatives of a 9,10-bridged anthracene for use in the copolymerization process are the 9,10-dihydro-9,10-bis(hydroxyalkyl) derivatives having the formula:

II.

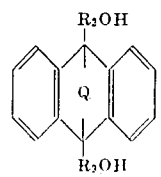

wherein Q has the meaning previously assigned to it and $R_2$ is an alkylene group having one to four carbon atoms.

Particularly desirable dicarboxylic acid derivatives of a 9,10-bridged anthracene for use in the copolymerization process are the 9,10-dihydro-9,10-bis(carbalkoxy) derivatives having the formula:

III.

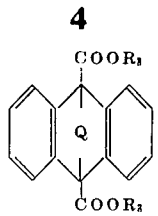

wherein Q has the meaning previously assigned to it and $R_3$ is a hydrogen atom or a monovalent hydrocarbon radical having one to four carbon atoms.

Other glycol derivatives of a 9,10-bridged anthracene which can be employed in the copolymerization reaction are those having the same hydroxyalkyl groups but are the position isomers of the compounds having the formula II. Similarly, other dicarboxylic acid derivatives of a 9,10-bridged anthracene which can be employed in the copolymerization reaction are those which are the position isomers of the compounds having the formula III.

Both aromatic and aliphatic dicarboxylic acids can be used in preparing the polyesters of this invention. Illustrative of the dicarboxylic acids that can be employed are, for example, succinic acid, glutaric acid, adipic acid, phenylenediacetic acid, phenylene dipropionic acid, diglycolic acid, thiodiglycolic acid, terephthalic acid, isophthalic acid, orthophthalic acid, 1,4-naphthalene dicarboxylic acid, 1,7-naphthalene dicarboxylic acid, 1,3-naphthalene dicarboxylic acid, 1,5-naphthalene dicarboxylic acid and 4,4'-diphenic acid.

Ethylene glycol, trimethylene glycol, tetramethylene glycol, pentamethylene glycol, hexamethylene glycol and decamethylene glycol, for example, are illustrative of the alkylene glycols that can be used in preparing the polyesters of this invention.

As noted hereinbefore improved results are obtained by incorporating one or more of the 9,10-bridged anthracene compounds having the formula I in the formulation used for preparing a conventional polyester. Thus, certain properties of an unmodified polyester made from equimolar amounts of dimethyl terephthalate and ethylene glycol, can be improved by substituting an equivalent amount of a bis(hydroxyalkyl) derivative of a 9,10-bridged anthracene having the formula II, for example, for a minor portion of the ethylene glycol. Similarly, for example, a polyester having improved properties is obtained if the polyester is made by replacing a minor portion of the dimethyl terephthalate with an equivalent amount of a bis(carbalkoxy) derivative of a 9,10-bridged anthracene having the formula III. In certain embodiments of this invention, it is advantageous to replace minor portions of both the glycol and the dimethyl terephthalate with equivalent portions of the corresponding polyesterifiable, difunctional, 9,10-bridged anthracene compounds having the formula I. Furthermore, it is intended to be within the scope of this invention to prepare polyesters entirely from the 9,10-bridged anthracene compounds having the formula I, i.e., by the reaction of a bis(hydroxyalkyl) derivative of a 9,10-bridged anthracene, such as those having the formula II, for example, and a bis(carbalkoxy) derivative of a 9,10-bridged anthracene, such as those having the formula III, for example, without including any other types of glycols, dicarboxylic acids, or dicarboxylic acid derivatives.

The amount of 9,10-bridged anthracene derivative which is employed as a modifier in the preparation of the polyester compositions of the invention, varies over a wide range of concentrations. When the 9,10-bridged anthracene derivative is used as a modifier of another polyester composition it has been found that at least about 2 mole-percent of the bridged anthracene derivative based upon the total moles of all components entering into the polyester reaction is necessary to produce a recognizable improvement in properties. This means that if the bridged anthracene derivative which is employed is a bis-(hydroxyalkyl) derivative of a 9,10-bridged anthracene, for example, there should be at least about 4 moles of the bridged anthracene derivative for every 96 moles of other glycol and 100 moles of aromatic dicarboxylic acid in the condensation mixture. The concentration of the 9,10-bridged anthracene when used as a modifier can be as high as 40 mole percent based on the total moles of all components but usually ranges between 5 and 25 mole percent.

When 9,10-bridged anthracene derivatives having the formula I are used as modifiers in the preparation of a conventional polyester composition, such as a polyethylene terephthalate formulation, very important improvements in dimensional stability, for example, are obtained by use of concentrations between 5 and 25 mole percent. Higher or lower mole concentrations, for example, concentrations as low as about 2 percent and concentrations as high as about 40 percent, may also be used, and the optimum for a given application will be determined by the requirements of the application.

Preferred polyester compositions of the invention include those which consist essentially of the copolymeric residue of terephthalic acid, ethylene glycol, and 2–25 mole percent, based on the total moles of all components in the polyester, of a 9,10-bridged anthracene having the general formula I.

The invention may be more fully understood by reference to the following illustrative examples. It is not intended that these examples shall limit or restrict the invention in any way whatsoever.

Example 1 Preparation of 9,10-bis(hydroxymethyl)triptycene

To a refluxing solution of 115 g. of 9,10-bis(acetoxymethyl)anthracene [prepared by the method of Miller et al., J. Am. Chem. Soc., 77, 2845 (1955)] in 3 liters of methylene chloride were added slowly and simultaneously 65 ml. of isopentyl nitrite (over a 4-hour period) and a solution of 58 g. of anthranilic acid in 600 ml. of acetone (over a 5-hour period). The reaction mixture was boiled under reflux for a total of 6 hours, allowed to stand overnight, washed twice with 12 percent aqueous potassium hydroxide, dried with anhydrous sodium sulfate, and evaporated to dryness. The crystalline residue was treated with 500 ml. of xylene and 50 g. of maleic anhydride and boiled under reflux for 10 minutes. The solution was then cooled, diluted with methylene chloride, washed twice with 12 percent aqueous potassium hydroxide, dried over anhydrous sodium sulfate and concentrated until crystallization was heavy. The off-white 9,10-bis(acetoxymethyl)triptycene obtained had a melting point of 281°–283°C. and weighed 85 g. Concentration of the mother liquor afforded an additional 16.5 g. of 9,10-bis(acetoxymethyl)triptycene having a melting point of 270°–280°C. The total yield obtained represented 72 mole percent of the theoretical amount.

Calculated for $C_{26}H_{22}O_4$, C, 78.7; H, 5.9
Found C, 78.4; H, 5.4

To a boiling solution of 85 g. of 9,10-bis(acetoxymethyl)triptycene in 2 liters of dioxane was added slowly a solution of 85 g. of potassium hydroxide in 500 ml. of water. The reaction mixture was boiled for 2 hours until approximately 1 liter of solvents distilled. Approximately 3 liters of water were then added to precipitate crude 9,10-bis(hydroxymethyl)-triptycene as a white solid, and the mixture was allowed to cool. The product in the amount of 66 g. had a melting point of 305°–308°C. and was collected and recrystallized from 2-butanone (charcoal) to obtain 58 g. (87 mole percent) of pure 9,10-bis(hydroxymethyl)triptycene having a melting point of 308°–309°C. Elemental analysis agreed well with the calculated analysis of $C_{22}H_{18}O_2$:

Calculated: C, 84.0; H, 5.8.
Found: C, 83.8; H, 5.5.

Example 2 Preparation of 9,10-bis(carbethoxy)triptycene

To a solution of 19 g. of 9,10-bis(hydroxymethyl)-triptycene in 1 liter of acetone was added a solution of 19 g. of chromium trioxide and 20 ml. of concentrated sulfuric acid in 175 ml. of water. The resulting solution was boiled under reflux for 30 minutes and then poured into about 3 liters of ice water to obtain a white precipitate of 9,10-triptycenedicarboxylic acid, in the amount of 19 g. (92 mole percent) having a melting point of more than 475°C. Elemental analysis agreed well with the calculated values for $C_{22}H_{14}O_4$:

Calculated: C, 77.3; H, 4.1
Found: C, 77.4; H, 4.5

To a refluxing mixture of 65.5 g. of 9,10-triptycenedicarboxylic acid in 800 ml. of chloroform were added 80 ml. of thionyl chloride and 5 ml. of dimethylformamide. The mixture was refluxed for 2 hours and then another 30 ml. of thionyl chloride were added. The mixture was then refluxed for an additional 1.5 hours. Next, the solvents were removed under vacuum and then 250 ml. of methylene chloride and 250 ml. of absolute ethanol were added. This mixture was boiled for 15 minutes until all the methylene chloride was removed. After cooling, the product was removed and recrystallized twice from benzene-cyclohexane to give 42.8 g. (56 mole percent) of 9,10-bis(carbethoxy)triptycene having a melting point of 237°–238°C. Elemental analysis agreed well with the values calculated for $C_{26}H_{22}O_4$:

Calculated: C, 78.4; H, 5.5
Found: C, 78.2; H, 5.8

Example 3 Preparation of poly(ethylene terephthalates) modified with triptycene derivatives A copolyester having the molar proportions of 1.0 mole ethylene glycol, 0.9 mole dimethyl terephthalate and 0.1 mole 9,10-bis(carbethoxy)triptycene was prepared as follows. A 50 ml. polymerization flask equipped with a still head and a gas insert tube was charged with 17.64 g. (0.09 mole) dimethyl terephthalate, 3.92 g. (0.01 mole) 9,10-bis(carbethoxy)triptycene, 6.6 g. (0.106 mole) ethylene glycol, and one drop of triisopropyl titanate and heated for 3 hours at 250°C. while a gentle stream of nitrogen was bubbled through the solution. Transesterification began at once.

After distillation of methanol ceased, the still head was removed, a stainless steel stirrer was inserted into the mixture, high vacuum was applied, and the mixture was stirred at 275°C. for 1 hour to obtain a highly viscous polymer.

Other modified poly(ethylene terephthalates) were prepared by a similar procedure except that dibutyltin oxide was used as the catalyst in place of triisopropyl titanate in order to obtain a lighter colored product. The proportions of the reactants employed and the results of the tests made on the poly(ethylene terephthalate) compositions obtained are given in Table I which follows.

| Mole-Percent Glycol Component | | Inherent Viscosity (50/50 phenol/ chloro- benzene) | Glass Transition Temperature °C. |
|---|---|---|---|
| Ethylene Glycol | 9,10-dihydro- 9,10-bis(hydroxy- methyl)-9,10- ethanoanthracene | | |
| 100 | — | — | 79 |
| 83 | 17 | 0.60 | 115 |
| 66 | 34 | 0.27 | 135 |
| 31 | 69 | 0.16 | 143 |

Example 6 Preparation of 9,10-Dihydro-9,10-bis(hydroxymethyl)-9,10-(2,3-bicyclo[2.2.1]heptano)anthracene

TABLE I

| Composition | Mole percent glycol component | | Mole percent diester component | | Inherent viscosity (50/50 phenol/ chloro- benzene) | Glass transi- tion temp., °C. | Melting point range, °C. | Temperature at which crystals disapppear on heating, °C. | Temperature at which spontaneous crystalli- zation occurs on cooling, °C. |
|---|---|---|---|---|---|---|---|---|---|
| | Ethylene glycol | 9,10-bis (hydroxy- methyl)- triptycene | Dimethyl- tereph- thalate | 9,10-bis- (carbeth- oxy)- triptycene | | | | | |
| A | 100 | | 100 | | | 79 | 256 | 126 | 225 |
| B | 95 | 5 | 100 | | Insoluble | 89 | 212–242 | 168 | 181 |
| C | 90 | 10 | 100 | | 0.37 | 99 | | | |
| D | 80 | 20 | 100 | | 0.26 | 139 | | | |
| E | 75 | 25 | 100 | | 0.20 | 140 | | | |
| F | 65 | 35 | 100 | | 0.26 | 170 | | | |
| G | 100 | | 95 | 5 | 0.48 | 70 | 211–248 | 125 | 206 |
| H | 100 | | 90 | 10 | 0.48 | 76 | 219–251 | 122 | 223 |
| I | 100 | | 80 | 20 | | (1) | 232–250 | | 218 |

1 Would not quench.

Example 4 Preparation of 9,10-dihydro-9,10-bis(hydroxymethyl)-9,10-ethanoanthracene Ethylene (maximum cylinder pressure) and 50 g. of 9,10-bis(acetoxymethyl) anthracene were heated at 200° for 48 hours in a sealed bomb. The reaction product was recrystallized twice from benzene to give two crops of white product, 9,10-dihydro-9,10-bis(acetoxymethyl)-9,10-ethanoanthracene. The first crop of 36.5 g. melted at 177°–79°C. and the second crop of 2.9 g. melted at 175°–78°C.

Analysis: Calculated for $C_{22}H_{22}O_4$: C, 75.4; H, 6.3.
Found: C, 75.2; H, 6.4. (first crop)

To a refluxing mixture of 15.2 g. of 9,10-dihydro-9,10-bis(acetoxymethyl)-9,10-ethanoanthracene in 100 ml. of ethanol was added a solution of 10 g. of potassium hydroxide in 10 ml. of water. The mixture was refluxed for 16 hours. The solvents were removed and the residue was treated with methylene chloride and dilute hydrochloric acid. The methylene chloride layer was concentrated to dryness, and the residue was recrystallized from acetonitrile to give two crops of white product, the first crop of 7.7 g. melting at 205°–6°C., and the second crop of 1.2 g. melting at 204°–6°C.

Analysis: Calculated for $C_{18}H_{18}O_2$: C, 81.2; H, 6.8.
Found: C, 81.0; H, 7.1. (first crop)

Example 5 Preparation of a copolyester from ethylene glycol, dimethyl terephthalate and 9,10-dihydro-9,10-bis(hydroxymethyl)-9,10-ethanoanthracene Modified poly(ethylene terephthalates) were prepared by a two-stage melt process at 225°–50°C. using 100 mole-percent dimethyl terephthalate as the diester component and dibutyltin oxide as a catalyst by the method described in Example 3. The following table shows the composition and properties of the polymers obtained:

An excess of bicyclo[2.2.1]heptene and 100 g. of 9,10-bis(acetoxymethyl)anthracene were heated at 200°C. for 48 hours in a sealed bomb. The gummy reaction product was removed from the bomb with methylene chloride and this solution was concentrated until most of the solvents were removed. About 200 ml. of ethanol was added along with seed crystals, and the solution was refrigerated overnight. The crude product was removed by filtration. An analytical sample was prepared from a similar smaller run by recrystallization of the crude product from benzene-heptane and 2-butanone. The white product, 9,10-dihydro-9,10-bis(acetoxymethyl)-9,10-(2,3-bicyclo[2.2.1]heptano)-anthracene, melted at 172°–75°C.

Analysis: calculated for $C_{27}H_{28}O_4$: C, 77.9; H, 6.8.
Found: C, 78.0; H, 7.0.

The crude acetoxymethyl derivative obtained above was dissolved in 2.1 liters of hot ethanol, and a warm solution of 100 g. of potassium hydroxide in 100 ml. of water was added. The mixture was refluxed for 4 hours and the solvent was removed. The residue was treated with methylene chloride and water. The organic solution was treated with dilute hydrochloric acid before it was dried with sodium sulfate and concentrated to dryness. A solution of the residue in hot acetonitrile was treated with decolorizing carbon, filtered, and cooled to crystallize the product. The product was collected and dried to give 58 g., m.p. 259°–61°C., of tan product which was recrystallized twice from 2-butanone to give three crops of white product, the first crop of 30.0 g., melting at 260°–61°C., the second crop of 12.4 g., melting at 259°–61°C., and the third crop of 12.0 g., melting at 257°–59°C.

Calculated for $C_{23}H_{24}O_2$: C, 83.0; H, 7.3.
Found: C, 82.8; H, 7.6. (first crop)

Example 7 Preparation of a copolyester from ethylene glycol, dimethyl terephthalate and 9,10-dihydro-9,10-bis-(hydroxymethyl)-9,10-(2,3-bicyclo[2.2.1]heptano)-anthracene.

Modified poly(ethylene terephthalates) were prepared by a two-stage melt process at 225°–50°C. using 100 mole-percent dimethyl terephthalate as the diester component and dibutyltin oxide as a catalyst by the method described in Example 3. The following table shows the composition and properties of the polymers obtained.

Mole-Percent Glycol Component

| Ethylene Glycol | 9,10-Dihydro-9,10-bis(hydroxymethyl)-9,10-(2,3-bicyclo[2.2.1]-heptano) anthracene | Inherent Viscosity (50/50 phenol/chlorobenzene) | Glass Transition Temperature °C. |
|---|---|---|---|
| 100 | — | — | 79 |
| 83 | 17 | 0.49 | 122 |
| 66 | 34 | 0.23 | 153 |
| 31 | 69 | 0.20 | 203 |

Example 8 Preparation of 9,10-Dihydro-9,10-bis(hydroxymethyl)-N-phenyl-9,10-ethanoanthracene-11,12-dicarboximide To a warm solution of 65 g. of 9,10-bis(acetoxymethyl)-anthracene in 2.5 liters of toluene was added a solution of 36 g. of N-phenylmaleimide in 300 ml. of toluene. The reaction solution was refluxed for 4 hours and was then concentrated to about 1 liter to give 80 g. of white product, 9,10-dihydro-9,10-bis(acetoxymethyl)-N-phenyl-9,10-ethanoanthracene-11,12-dicarboximide, melting at 207°–209°C.

Calculated for $C_{30}H_{25}NO_6$: C, 72.7; H, 5.1; N, 2.8.
Found: C, 72.6; H, 5.4; N, 2.9.

To a suspension of 73.5 g. of 9,10-dihydro-9,10-bis-(acetoxymethyl)-N-phenyl-9,10-ethanoanthracene-11,12-dicarboximide in 3.5 liters of refluxing ethanol was added a solution of 73.5 g. of potassium hydroxide in 184 ml. of water. The reaction mixture first became clear and then a heavy precipitate formed during a reflux period of one hour. The precipitate was removed from the cooled solution and was then suspended in 1 liter of boiling water. The solid was removed and recrystallized from acetonittile to give two crops of white product, the first crop of 50.0 g., melting at 302°–303°C., and the second crop of 3.4 g., melting at 294°–297°C.

Calculated for $C_{26}H_{21}NO_4$: C, 76.0; H, 5.1; N, 3.4.
Found: C, 75.7; H, 5.1; N, 3.5. (first crop)

By the use of an equivalent amount of maleimide, N-methylmaleimide, N-ethylmaleimide, N-n-propylmaleimide, N-isopropylmaleimide and N-n-butylmaleimide in place of N-phenylmaleimide in the foregoing example 9,10-dihydro-9,10bis(hydroxymethyl)-9,10-ethanoanthracene-11,12-dicarboximide, 9,10-dihydro-9,10-bis(hydroxymethyl)-N-methyl-9,10-ethanoanthracene-11,12-dicarboximide, 9,10-dihydro-9,10-bis(hydroxymethyl)-N-ethyl-9,10-ethanoanthracene-11,12-dicarboximide, 9,10-dihydro-9,10-bis(hydroxymethyl)-N-n-propyl-9,10-ethanoanthracene-11,12-dicarboximide, 9,10-dihydro-9,10-bis(hydroxymethyl)-N-isopropyl-9,10-ethanoanthracene-11,12-dicarboximide, and 9,10-dihydro-9,10-bis-(hydroxymethyl)-N-n-butyl-9,10-ethanoanthracene-11,12-dicarboximide, respectively, are obtained.

Example 9 Preparation of a copolyester from ethylene glycol, dimethyl terephthalate and 9,10-dihydro-9,10-bis-(hydroxymethyl)-N-phenyl-9,10-ethanoanthracene-11,12-dicarboximide Modified poly(ethylene terephthalates) were prepared by a two-stage melt process at 225°–50°C. using 100 mole-percent dimethyl terephthalate as the diester component and dibutyltin oxide as a catalyst by the method described in Example 3. The following table shows the composition and properties of the polymers obtained.

Mole-Percent Glycol Component

| ethylene Glycol | 9,10-Dihydro-9,10-bis(hydroxymethyl)-N-phenyl-9,10-ethanoanthracene-11,12-dicarboximide | Inherent Viscosity (50/50 phenol/chlorobenzene) | Glass Transition Temperature °C. |
|---|---|---|---|
| 100 | — | — | 99 |
| 83 | 17 | 0.23 | 102 |
| 66 | 34 | 0.12 | 108 |
| 31 | 69 | 0.08 | 98–120 |

By the use of methanol, n-propyl alcohol, isopropyl alcohol, n-butyl alcohol, isobutyl alcohol and secondarybutyl alcohol, for example, in place of ethanol in Example 2, 9,10-bis(carbomethoxy)triptycene, 9,10-bis(carbo-n-propoxy)triptycene, 9,10-bis(carbo-n-butoxy)triptycene, 9,10-bis(carbisobutoxy)-triptycene and 9,10-bis(carbo-sec-butoxy)triptycene can be prepared.

Other 9,10-bridged anthracene compounds having the formula I that can be prepared in accordance with the procedures set forth herein and used in preparing the polyesters of this invention include, for example, 9,10-bis($\beta$-hydroxyethyl)triptycene, 9,10-bis($\gamma$-hydroxypropyl)triptycene, 9,10-bis($\omega$-hydroxy-butyl)triptycene, 9,10-dihydro-9,10-bis(hydroxymethyl)-9,10-(2,3-bicyclo[2.1.1]hexano)anthracene, 9,10-dihydro-9,10-bis-(hydroxymethyl)-9,10-(2,3-bicyclo[2.2.2]octano)anthracene, 9,10-dihydro-9,10-bis(hydroxymethyl)-9,10-(2,3-bicyclo[2.3.2]-nonano)anthracene, 9,10-dihydro-9,10-bis(carbethoxy)-9,10-(2,3-bicyclo[2.2.1]heptano)anthracene, 9,10-dihydro-9,10-bis(carboxy)-9,10-(2,3-bicyclo[2.2.1]heptano)anthracene, 9,10-dihydro-9,10-bis(carbomethoxy)-N-phenyl-9,10-ethanoanthracene-11,12-dicarboximide, 9,10-dihydro-9,10-bis(carbethoxy)-N-phenyl-9,10-ethanoanthracene-11,12-dicarboximide, 9,10-dihydro-9,10-bis(carboxy)-N-phenyl-9,10-ethanoanthracene-11,12-dicarboximide, 9,10-dihydro-9,10-bis(carboxy)-9,10-ethanoanthracene, 9,10-dihydro-9,10-bis(carbomethoxy)-9,10-ethanoanthracene, 9,10-dihydro-9,10-bis(carbethoxy)-9,10-ethanoanthracene, 9,10-dihydro-9,10-bis($\beta$-hydroxyethyl)-9,10-ethanoanthracene, 9,10-dihydro-9,10-bis-(hydroxymethyl)-9,10-chloroethanoanthracene, 9,10-dihydro-9,10-bis(carboxy)-9,10-chloroethanoanthracene, 9,10-dihydro-9,10-bis(carbethoxy)-9,10-chloroethanoanthracene, 9,10-dihydro-9,10-bis(hydroxymethyl)-9,10-(1,2-dichloroethano)-anthracene, 9,10-dihydro-9,10-bis(hydroxymethyl)-9,10-cyclohexanoanthracene, 9,10-dihydro-9,10-bis(hydroxymethyl)-9,10-cyclopentanoanthracene, 9,10-dihydro-9,10-bis(hydroxymethyl)-11-methyl-9,10-ethanoanthracene, 9,10-dihydro-9,10-bis(hydroxymethyl)-11,12-dimethyl-9,10-ethanoanthracene, etc.

The 9,10-bridged anthracene compounds wherein X and Y each represent the same hydroxyalkyl group are prepared from the corresponding 9,10-bis(acyloxyalkyl)-9,10-bridged anthracene compounds. The preparation of 9,10-bis(hydroxymethyl)-triptycene, 9,10-bis(hydroxymethyl)-9,10-ethanoanthracene, 9,10-dihydro-9,10-bis(hydroxymethyl)-9,10-(2,3-bicyclo[2.2.1]-heptano)anthracene and 9,10-dihydro-9,10-bis(hydroxymethyl)-N-phenyl-9,10-ethanoanthracene-11,12-dicarboximide, for example, is described in Examples 1,4,6 and 8, respectively. These compounds are prepared from the corresponding 9,10-bis(acetoxymethyl)anthracene compounds. They can also be prepared from other corresponding 9,10-bis(acyloxymethyl)anthracenes such as, for example, the corresponding 9,10-bis(propionyloxymethyl)-anthracene compounds. However, the use of the 9,10-bis(acetoxymethyl)anthracene compounds is preferred.

For the introduction of a β-hydroxyethyl, a γ-hydroxy-propyl or an ω-hydroxybutyl group in each of the 9- and 10-positions of the 9,10-bridged anthracene compounds the corresponding 9,10-bis(β-acetoxyethyl)anthracene, 9,10-bis(γ-acetoxy-n-propyl)anthracene and 9,10-bis(ω-acetoxy-n-butyl)anthracene compounds, respectively, are preferably employed. However, as noted in the preceding paragraph, the acyloxy portion of the acyloxyalkyl group can be an acyloxy group higher than acetoxy such as propionyloxy, n-butyryloxy or an even high acyloxy group, for example. From a cost viewpoint the use of an acyloxy group higher than acetoxy is not practical at the present time.

The 9,10-bis(acyloxyalkyl)-9,10-bridged anthracene compounds are new compounds and are claimed by this application. The 9,10-bridging members are those defined by the letter Q in formula I. Illustrative of these 9,10-bis(acyloxyalkyl)-9,10-bridged anthracene compounds are, for example, 9,10-bis(β-acetoxyethyl)triptycene, 9,10-bis(γ-acetoxy-propyl)triptycene, 9,10-bis(ω-acetoxy-n-butyl)triptycene, 9,10-dihydro-9,10-bis(β-acetoxyethyl)-9,10-ethanoanthracene, 9,10-dihydro-9,10-bis(γ-acetoxypropyl)-9,10-ethanoanthracene, 9,10-dihydro-9,10-bis(ω-acetoxy-n-butyl)-9,10-ethanoanthracene, 9,10-dihydro-9,10-bis(β-acetoxyethyl)-9,10-(2,3-bicyclo[2.2.1]-heptano)anthracene, 9,10-dihydro-9,10-bis(γ-acetoxypropyl)-9,10-(2,3-bicyclo[2.2.1]heptano)anthracene, 9,10-dihydro-9,10-bis-(ω-acetoxy-n-butyl)-9,10-(2,3-bicyclo[2.2.1]heptano)anthracene, 9,10-dihydro-9,10-bis(β-acetoxyethyl)-N-phenyl-9,10-ethanoanthracene-11,12-dicarboximide, 9,10-dihydro-9,10-bis(γ-acetoxy-propyl)-N-phenyl-9,10-ethanoanthracene-11,12-dicarboximide, 9,10-dihydro-9,10-bis(γ-acetoxy-n-butyl)-N-phenyl-9,10-ethanoanthracene-11,12-dicarboximide, 9,10-bis(propionyloxymethyl)-triptycene, 9,10-bis(β-propionyloxyethyl)triptycene, 9,10-dihydro-9,10-bis(propionyloxymethyl)-9,10-ethanoanthracene, 9,10-dihydro-9,10β-propionyloxyethyl)-9,10-ethanoanthracene, 9,10-dihydro-9,10-bis(propionyloxymethyl)-9,10-(2,3-bicyclo-[2.2.1]heptano)anthracene, 9,10-dihydro-9,10-bis(β-propionyloxyethyl)-9,10-(2,3-bicyclo[2.2.1]heptano) anthracene, 9,10-dihydro-9,10-bis(propionyloxymethyl)-N-phenyl-9,10-ethanoanthracene-11,12-dicarboximide, 9,10-dihydro-9,10-bis(β-propionyloxyethyl)-N-phenyl-9,10-ethanoanthracene-11,12-dicarboximide, 9,10-dihydro-9,10-bis(propionyloxymethyl)-9,10-ethanoanthracene-11,12-dicarboximide, 9,10-dihydro-9,10-bis(β-propionyloxyethyl)-9,10-ethanoanthracene-11,12-dicarboximide, 9,10-dihydro-9,10-bis-(propionyloxymethyl)-N-methyl-9,10-ethanoanthracene-11,12-dicarboximide, 9,10-dihydro-9,10-bis(β-propionyloxyethyl)-N-ethyl-9,10-ethanoanthracene-11,12-dicarboximide, etc.

The new 9,10-bis(acyloxyalkyl)-9,10-bridged anthracene compounds of the invention can be prepared by known techniques familiar to those skilled in the art to which this invention is directed. To illustrate the 9,10-bis(acetoxymethyl) compounds corresponding to the 9,10-bis(hydroxymethyl) compounds of Examples 1,4,6 and 8 can be prepared by reacting the 9,10-bis(hydroxymethyl) compounds with acetic anhydride. Similarly, the corresponding 9,10-bis(propionyloxymethyl) compounds can be prepared by reacting the 9,10-bis(hydroxymethyl) compounds with propionic anhydride ($CH_3CH_2CO)_2O$.

9,10-bis(β-acetoxyethyl)-9,10-bridged anthracene compounds of the invention can be prepared by reacting 9,10-bis-(β-hydroxyethyl)anthracene with acetic anhydride to obtain 9,10-bis(β-acetoxyethyl)anthracene which in turn is converted to the 9,10-bis(β-acetoxyethyl)-9,10-bridged anthracene compounds of the invention by the procedures described hereinbefore. Thus, 9,10-bis(β-acetoxyethyl)triptycene can be prepared by substituting an equivalent amount of 9,10-bis(β-acetoxyethyl)-anthracene for 9,10-bis(acetoxymethyl)anthracene in Example 1. Similarly, 9,10-bis(γ-acetoxy-n-propyl)triptycene can be prepared by substituting an equivalent amount of 9,10-bis(γ-acetoxy-n-propyl)anthracene for 9,10-bis(acetoxymethyl)anthracene in Example 1. 9,10-bis(γ-acetoxy-n-propyl)anthracene can be prepared by reacting 9,10-bis(γ-hydroxypropyl)anthracene with acetic anhydride. 9,10-bis(β-hydroxyethyl)anthracene and 9,10-bis(γ-hydroxypropyl)anthracene are known compounds. [See Miller et al., J. Am. Chem. Soc., 77, pages 2845-8 (1955)].

The polymerization reaction, as indicated hereinbefore, can be advantageously facilitated by the employment of a catalyst. The best catalyst for each reaction is determined by the nature of the reactants. Generally, when an alkyl ester of the dicarboxylic acid is being employed, an ester interchange type of catalyst is to be preferred. Numerous patents have issued in recent years describing numerous advantageous catalysts which can be employed. Various techniques as to the use of the catalysts are well known in the art. Suitable catalysts include, for example, dibutyltin oxide, triisopropyl titanate, sodium methoxide, magnesium, antimony oxide, boric oxide, cobaltous acetate, zinc acetate, alkali titanates and $NaHTi(OBu)_6$. It will be understood that other catalysts in addition to those specifically named can be employed.

The term o-phenylene wherever used herein and in the claims refers to the group having the formula

We claim:
1. A 9,10-bridged anthracene compound having the general formula:

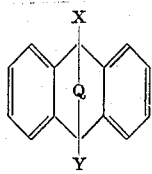

wherein X and Y each represents the same member selected from the group consisting of a carboxy group, a carbalkoxy group of two to five carbon atoms and an $R_1COOR_2$- group wherein $R_1$ is alkyl of one to four carbon atoms and $R_2$ is alkylene of one to four carbon atoms and Q represents:

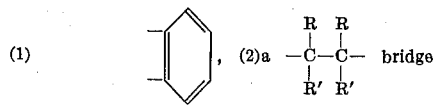

wherein each R represents a hydrogen atom, a halogen atom or an alkyl group, each R' is a hydrogen atom and wherein both R's collectively represent a chemical bond, (3) a bicyclohexano group, (4) a bicycloheptano group, (5) a bicycloctano group, (6) a bicyclononano group, (7) a 5-membered cycloalkphatic ring or (8) a 6-membered cycloaliphatic ring.

2. A compound in accordance with claim 1 wherein X and Y each represents a carboxy group.

3. A compound in accordance with claim 1 wherein X and Y each represents an acetoxymethyl group.

4. A compound in accordance with claim 1 wherein Q is ortho phenylene.

5. A compound in accordance with claim 1 wherein Q is 2,3-bicyclo[2.2.1]heptano.

6. A compound in accordance with claim 1 wherein Q is ethano.

7. A compound in accordance with claim 1 wherein said compound is 9,10=bis(acetoxymethyl)triptycene.

8. A compound in accordance with claim 1 wherein said compound is 9,10-dihydro-9,10-bis(acetoxymethyl)-9,10-ethanoanthracene.

9. A compound in accordance with claim 1 wherein said compound is 9,10-dihydro-9,10-bis(acetoxymethyl)-9,10-(e,3-bicyclo[2.2.1]heptano)anthracene.

10. A compound in accordance with claim 1 wherein said compound is 9,10-triptycenedicarboxylic acid.

11. A compound in accordance with claim 1 wherein said compound is 9,10-bis(carbethoxy)triptycene.

* * * * *